(12) United States Patent
Fields et al.

(10) Patent No.: US 7,774,784 B2
(45) Date of Patent: Aug. 10, 2010

(54) DETERMINING AN ACTUAL AMOUNT OF TIME A PROCESSOR CONSUMES IN EXECUTING A PORTION OF CODE

(75) Inventors: Mahlon David Fields, Kirkland, WA (US); Richard T. Wurdack, Seattle, WA (US); Steven M. Carroll, Sammamish, WA (US); Barry M. Nolte, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1522 days.

(21) Appl. No.: 11/082,398

(22) Filed: Mar. 17, 2005

(65) Prior Publication Data

US 2006/0212867 A1 Sep. 21, 2006

(51) Int. Cl.
*G06F 9/46* (2006.01)
*G06F 9/44* (2006.01)
*G06F 11/00* (2006.01)

(52) U.S. Cl. .............. 718/104; 718/100; 718/107; 718/108; 717/127; 717/128; 717/131; 714/37; 714/38

(58) Field of Classification Search ............ 718/1, 718/100, 101, 102, 103, 104, 105, 107, 108; 717/124, 127, 128, 130, 131; 714/37, 38, 714/39
See application file for complete search history.

(56) References Cited

U.S. PATENT DOCUMENTS

| 5,774,718 | A | * | 6/1998 | Aoshima et al. | 718/100 |
| 5,797,115 | A | * | 8/1998 | Fuller | 702/186 |
| 5,944,778 | A | * | 8/1999 | Takeuchi et al. | 718/100 |
| 6,009,452 | A | * | 12/1999 | Horvitz | 718/102 |
| 6,052,708 | A | * | 4/2000 | Flynn et al. | 718/108 |
| 6,085,218 | A | * | 7/2000 | Carmon | 718/107 |
| 6,334,210 | B1 | * | 12/2001 | Miura et al. | 717/128 |
| 6,658,654 | B1 | * | 12/2003 | Berry et al. | 717/131 |
| 6,934,936 | B2 | * | 8/2005 | Clegg et al. | 717/127 |
| 7,191,440 | B2 | * | 3/2007 | Cota-Robles et al. | 718/1 |
| 7,383,332 | B2 | * | 6/2008 | Chong et al. | 709/224 |
| 7,426,731 | B2 | * | 9/2008 | Findeisen | 718/104 |
| 7,565,659 | B2 | * | 7/2009 | Day et al. | 718/108 |
| 7,594,234 | B1 | * | 9/2009 | Dice | 718/108 |

(Continued)

FOREIGN PATENT DOCUMENTS

EP 0 762 286 B1 3/1997

(Continued)

*Primary Examiner*—Meng-Ai An
*Assistant Examiner*—Abdullah Al Kawsar
(74) *Attorney, Agent, or Firm*—Wolf, Greenfield & Sacks, P.C.

(57) ABSTRACT

Systems and methods are provided that determine the actual amount of time a processor consumes in executing a code portion. The actual execution time of a code portion may be accurately determined by taking into consideration context switches and/or overhead time corresponding to the code portion. Determining the actual execution time of a code portion may include recording context switches and time values that occur during the execution of the code portion. This information along with overhead measurements may be used to generate the actual execution time of a code portion, as will be described in more detail below. For example, the switched-out intervals resulting from the context switches and the overhead time associated with the time measurements may be subtracted from the elapsed time to produce the actual execution time of a code portion.

14 Claims, 7 Drawing Sheets

U.S. PATENT DOCUMENTS

2002/0198925 A1    12/2002    Smith et al.
2006/0248401 A1*    11/2006    Carroll et al. ................. 714/38

FOREIGN PATENT DOCUMENTS

| | | | |
|---|---|---|---|
| EP | 762286 A1 * | 3/1997 | |
| EP | 1 174 794 A1 | 1/2002 | |
| EP | 1 391 824 A2 | 2/2004 | |
| JP | 2002063049 | * | 2/2002 |

* cited by examiner

| | Time Value | Thread Id | Event |
|---|---|---|---|
| 408 | 900 | 1 | Enter Function F() |
| 410 | 1010 | 2 | Enter Function S() |
| 412 | 1030 | 3 | Enter Function T() |
| 414 | 1120 | 2 | Exit Function S() |
| 416 | 1200 | 1 | Enter Function G() |
| 418 | 1300 | 3 | Exit Function T() |
| 420 | 1500 | 1 | Exit Function G() |
| 422 | 1550 | 1 | Exit Function F() |

| | 500 | 502 | 504 | 506 |
|---|---|---|---|---|
| | | Time Value | Old Thread Id | New Thread Id |
| 508 | | 1000 | 1 | 2 |
| 510 | | 1028 | 2 | 3 |
| 512 | | 1117 | 3 | 2 |
| 514 | | 1190 | 2 | 1 |
| 516 | | 1225 | 1 | 3 |
| 518 | | 1411 | 3 | 1 |

*FIG. 5*

| 600 | 602 | 604 | |
|---|---|---|---|
| | Event Type | Overhead | |
| | Function Entry | 3 | 606 |
| | Function Exit | 2 | 608 |

*FIG. 6*

DETERMINING AN ACTUAL AMOUNT OF TIME A PROCESSOR CONSUMES IN EXECUTING A PORTION OF CODE

BACKGROUND

Typically, during the development of a software application, performance tests are performed on one or more parts of the application. This testing often involves measuring an amount of time a processor spends (i.e., consumes) executing one or more portions of code (e.g., a function, a procedure, or other logical component) of the software application. For example, such an amount of time may be determined by recording a time at which execution of the code portion begins and a time at which execution of the code portion ends. These times are often recorded by including probes at locations within the software application (e.g., the beginning and end of the code portion), the execution of which results in the time values being recorded.

Determining the amount of execution time based solely on the time at which execution of the code portion begins and ends is not an accurate representation of the actual amount of time a processor consumes in executing the code portion. Recording the time values itself consumes time, including the time required to read the time value and the time required to write (i.e., record) the time value to a recording medium such as, for example, a volatile memory or a non-volatile storage medium. The time consumed to acquire (including reading and recording) time values is referred to herein as "overhead" or "overhead time."

For example, begin and end time measurements may indicate that a code portion consumed 800 processor cycles. However, it may have taken three processor cycles to record the begin time. Accordingly, the actual amount of time the processor consumed in executing the code portion (assuming no other variables such as context switches discussed below) is 800−3=797 processor cycles. It should be appreciated that the processor cycles consumed in acquiring the end time does not impact the accuracy of the measured execution time of the code portion. This is because the acquisition time for the end time occurs after the recorded end time itself.

Another problem arises in multi-tasking operating systems (OS). A multi-tasking OS simulates concurrent operations of different processing threads on a processor (e.g., a central processing unit (CPU) or microprocessor) by alternating or interleaving execution of the different threads. After one thread has executed for a relatively short period of time (often referred to as a "quantum"), the OS interrupts the processor and adjusts its context to a different thread. Adjusting or switching the context of a processor from one thread to another is an event referred to herein as a "context switch." The time values recorded for the begin and end time of the execution of a code portion do not take into account whether one or more context switches have occurred between the begin time and end time herein. If one or more context switches occurred during this interval, then the interval is not an accurate representation of how much time the processor spent executing the code portion. That is, the interval will reflect a longer period of time than was actually consumed by the processor in executing the code portion itself.

SUMMARY

Applicants have recognized the need for a reliable system and method for determining the actual amount of time a processor consumes in executing a code portion, particularly when executed on a multi-tasking operating system.

Accordingly, described herein are systems and methods that determine the actual amount of time a processor consumes in executing a code portion. As used herein, the "active time" of a code portion is the actual amount of time a processor consumes in executing the code portion. The active time of a code portion may be accurately determined by taking into consideration context switches and/or overhead time corresponding to the code portion.

As used herein, the "elapsed time" of a code portion is the absolute time elapsed between the beginning and end times of the execution of the code portion (i.e., the temporal interval defined by the recorded beginning and end time of the execution of the code portion). The elapsed time of a code portion may include time that the processor consumed during a switched-out interval. As used herein, a "switched-out interval" is an interval that occurs, during an elapsed time interval, during which the processor executes a processing thread other than the processing thread corresponding to the code portion being measured. The elapsed time also may include overhead time resulting from the acquiring of the begin and end time values of the code portion. Further, it should be appreciated that the code portion may include additional probes other than the probes resulting in the recording of the begin and end times. For example, additional probes may have been placed at the beginning and ending of other code portions (e.g., functions, procedures or other logical components) within the code portion being measured. The execution of these additional probes produces additional overhead time within the elapsed time.

Determining the active time of a code portion may include recording context switches and time values that occur during the execution of the code portion. This information along with overhead measurements may be used to generate the active time of a code portion, as will be described in more detail below. For example, the switched-out intervals resulting from the context switches and the overhead time associated with the time measurements may be subtracted from the elapsed time to produce the active time of a code portion.

In an embodiment of the invention, an actual amount of time consumed by a processor of a multi-tasking operating system in executing a portion of code of a first processing thread is determined. First information is received indicative of a first temporal interval defining a begin time and an end time of execution of the code portion. Second information is received indicative of one or more second temporal intervals, occurring within the first temporal interval, during which the processor executed a processing thread other than the first processing thread. Based on the first and second information, the actual amount of time consumed in executing the code portion is determined.

In an aspect of this embodiment, a total combined time of the one or more second temporal intervals is subtracted from the first temporal interval.

In another aspect of this embodiment, third information is received indicative of overhead time consumed in acquiring the first information during the first temporal interval. Determining the actual amount of time includes subtracting, from the first temporal interval, the overhead time and a total combined time of the one or more second temporal intervals.

In another aspect of this embodiment, the second information includes a plurality of information elements. Each first information element specifies a particular time, an old thread from which the processor switched context at the particular time, and a new thread to which the processor switched context at the particular time. Determining the actual amount of time includes determining, for each of the one or more second temporal intervals, a begin time and an end time of the second temporal interval based on the information elements.

In yet another aspect of this embodiment, the first information includes a plurality of first information elements, each first information element specifying a time, a processing thread and a type of event. Determining the actual amount of time includes an act of determining a begin time and an end time of the first temporal interval based on the plurality of first information elements.

In another aspect of this embodiment, the second information includes a plurality of second information elements. Each second information element specifies a particular time, an old thread from which the processor switched context at the particular time, and a new thread to which the processor switched context at the particular time. Third information is received including one or more third information elements, each third information element specifying time consumed in executing a type of event. Determining the actual amount of time includes determining, for each of the one or more second temporal intervals, a begin time and an end time of the second temporal interval based on the second information elements. Determining the actual amount of time further includes determining, from the first and second information elements, a total overhead time consumed by the processor in acquiring the first information, and determining the actual amount of time consumed in executing the code portion.

In another aspect, one or more of the above acts and/or aspects of the above embodiment are performed on a computer system.

In another embodiment of the invention, a computer program product is provided. The product includes a computer-readable medium, and computer-readable signals stored on the computer-readable medium defining instructions that, as a result of being executed by a computer, instruct the computer to perform the method of the embodiment of the invention described in the preceding paragraphs and/or one or more aspects thereof described in the preceding paragraphs.

In another embodiment of the invention, a system is provided for determining an actual amount of processor time consumed by a processor of a multi-tasking operating system in executing a portion of code of a first processing thread. The system includes an actual time generator to receive first information indicative of a first temporal interval defining a begin time and an end time of execution of the code portion, to receive second information indicative of one or more second temporal intervals, occurring within the first temporal interval, during which the processor executed a processing thread other than the first processing thread, and to generate, based on the first and second information, the actual amount of processor time consumed in executing the code portion.

In an aspect of this embodiment, the actual time generator is operative to subtract a total combined time of the one or more second temporal intervals from the first temporal interval.

In another aspect of this embodiment, the actual time generator is operative to receive third information indicative of overhead time consumed in acquiring the first information during the first temporal interval, and to subtract, from the first temporal interval, the overhead time and a total combined time of the one or more second temporal intervals.

In another aspect of this embodiment, the second information includes a plurality of information elements. Each first information element specifies a particular time, an old thread from which the processor switched context at the particular time, and a new thread to which the processor switched context at the particular time. The actual time generator is operative to determine, for each of the one or more second temporal intervals, a begin time and an end time of the second temporal interval based on the information elements.

In yet another aspect of this embodiment, the first information includes a plurality of first information elements. Each first information element specifies a time, a processing thread and a type of event. The actual time generator is operative to determine a begin time and an end time of the first temporal interval based on the plurality of first information elements.

In another aspect of this embodiment, the second information includes a plurality of second information elements. Each second information element specifies a particular time, an old thread from which the processor switched context at the particular time, and a new thread to which the processor switched context at the particular time. The actual time generator is operative to receive third information including one or more third information elements, each third information element specifying time consumed in executing a type of event. The actual time generator is operative to determine, for each of the one or more second temporal intervals, a begin time and an end time of the second temporal interval based on the second information elements, to determine, from the first and second information elements, a total overhead time consumed by the processor in acquiring the first information, and to determine, based on the determinations made in the acts (C)(1)-(C)(3), the actual amount of time consumed in executing the code portion.

Other advantages, novel features, and objects of the invention, and aspects and embodiments thereof, will become apparent from the following detailed description of the invention, including aspects and embodiments thereof, when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment or aspect of the invention shown where illustration is not necessary to allow those of ordinary skill in the art to understand the invention.

BRIEF DESCRIPTION OF THE DRAWINGS

FIG. 5 is a block diagram illustrating an example of a table of information elements representing context switched events, according to some embodiments of the invention;

FIG. 6 is a block diagram illustrating an example of a table including a plurality of information elements representing overhead measurements, according to some embodiments of the invention;

DETAILED DESCRIPTION

The function and advantage of embodiments of the present invention will be more fully understood from the examples described below. The following examples are intended to facilitate a better understanding and illustrate the benefits of the present invention, but do not exemplify the full scope of the invention.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, shall be closed or semi-closed transitional phrases, as set forth, with respect to claims, in the United States Patent Office Manual of Patent Examining Procedures (Eighth Edition, Revision 2, May 2004), Section 2111.03.

EXAMPLES

Figure 1:
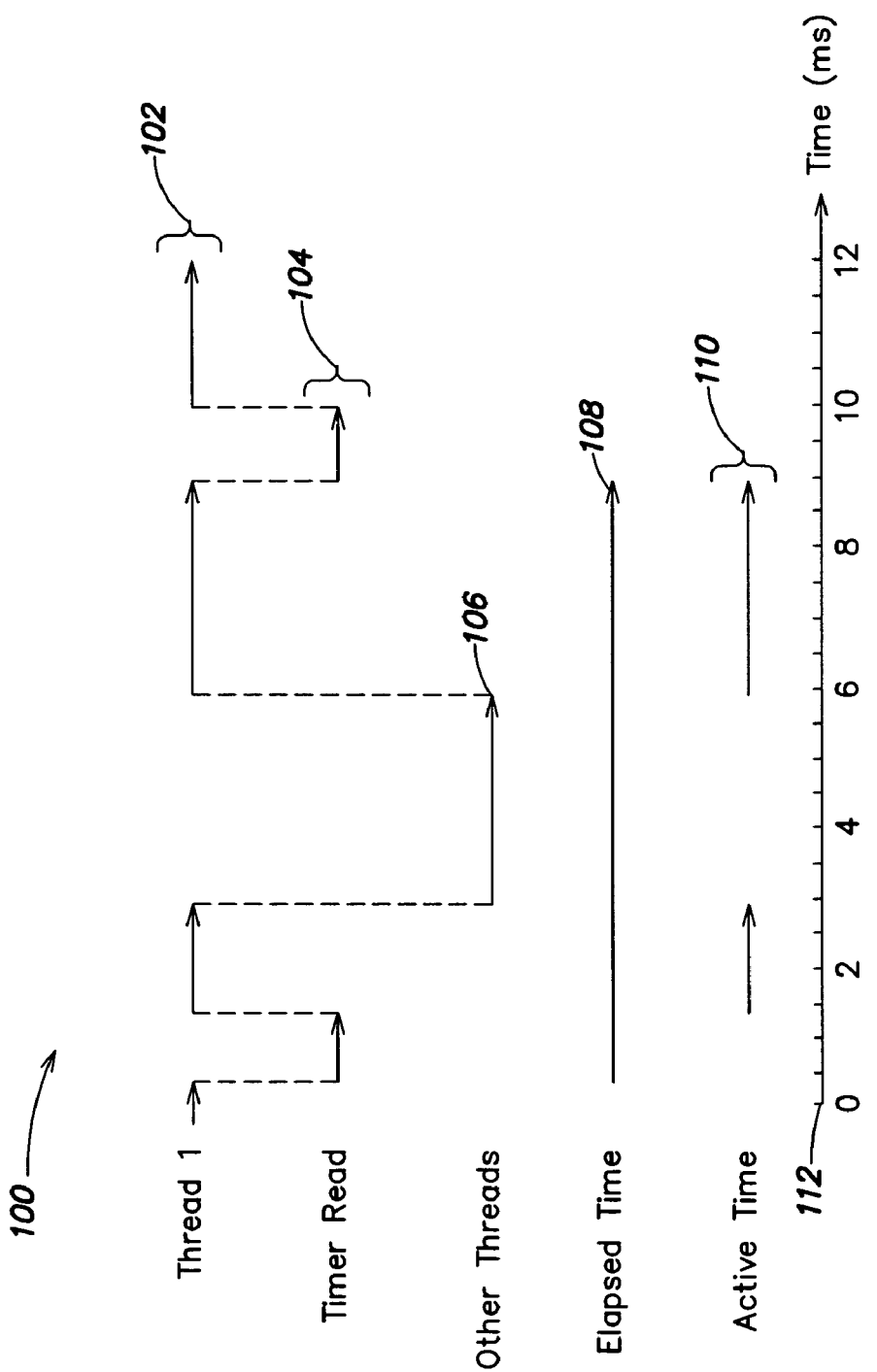
FIG. 1 is a timing diagram illustrating an example of the elapsed time and active time of the execution of a code portion, according to some embodiments of the invention.

FIG. 1 is a timing diagram 100 illustrating an example of the elapsed time and the active time of the execution of a code portion. Diagram 100 is merely an illustrative embodiment of a timing diagram for a code portion, and is not intended to limit the scope of the invention. Any of numerous other implementations of such a diagram, for example, variations of diagram 100, are possible and are intended to fall within the scope of the invention.

Time axis 112 shows that the timing diagram 100 represents a period of time from 0 to 12 milliseconds (ms). It should be appreciated that such a timing diagram may be illustrated using other units of time such as, for example, processor cycles. Graph 102 illustrates the times that the processor was executing Thread 1, from 1.5-3 ms and from 6-9 ms. Graph 104 illustrates that timer reads indicating the begin and end execution times of a code portion acquired from 0.5-1.5 ms and from 9-10 ms. Thus, graph 104 represents overhead time in acquiring time values for the coded portion.

Graph 106 illustrates a switched-out interval during which the processor was executing one or more threads other than Thread 1.

Based on graphs 102, 104 and 106, an elapsed time interval (graph 108) begins at 0.5 ms and ends at 9.0 ms, producing an elapsed time of 8.5 ms. Timing diagram 100 illustrates that, based on graphs 102-108, the active time (graph 110) of the coded portion is (3−1.5)+(9−6)=4.5 ms. Embodiments of the invention for determining the active time for a code portion, illustrated graphically in diagram 100, will now be described in relation to FIGS. 2-8.

Figure 2:
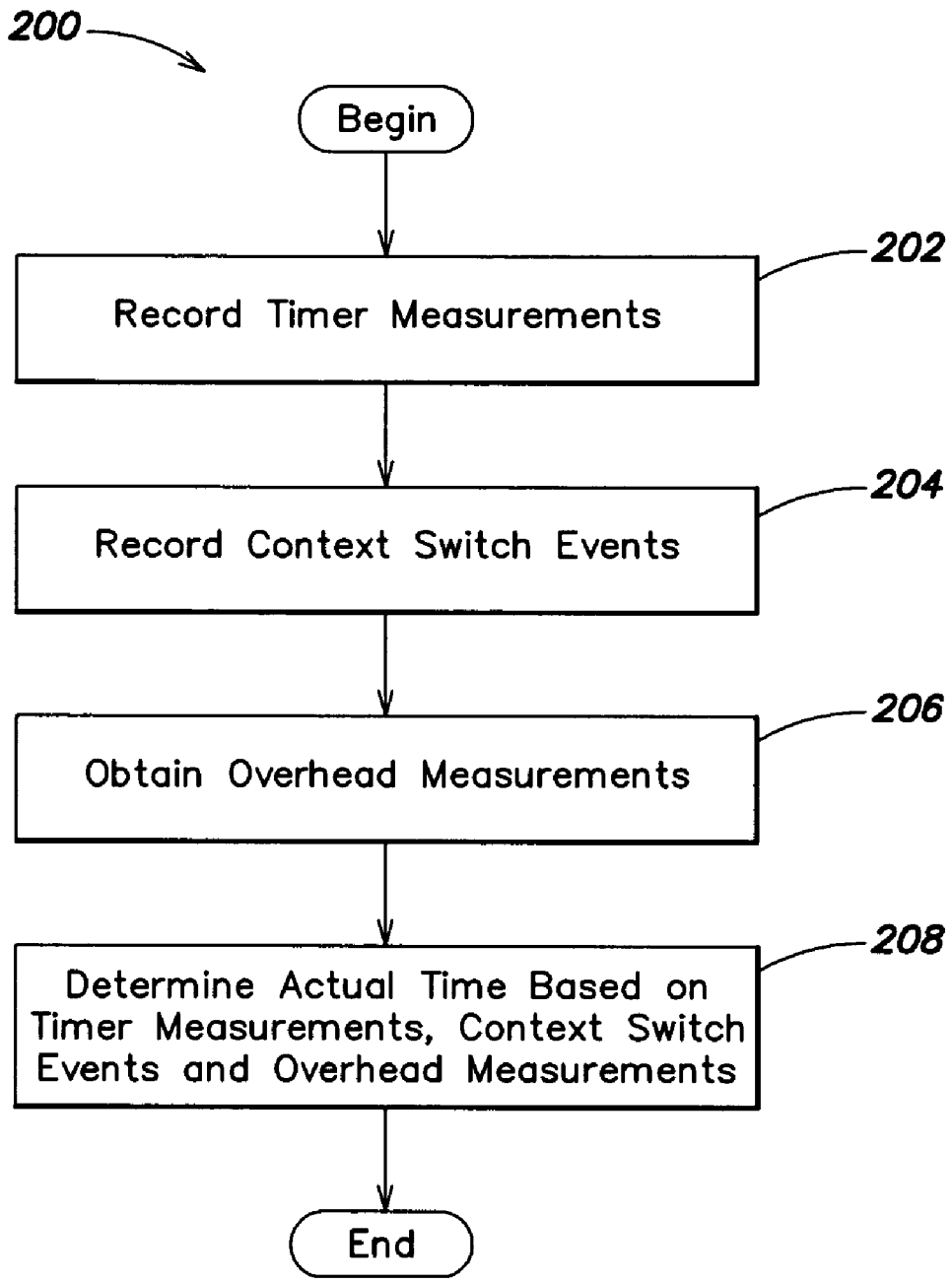
FIG. 2 is a flow chart illustrating an example of a method of determining the actual time a processor consumed in executing a code portion, according to some embodiments of the invention.

FIG. 2 is a flow chart illustrating an example of a method 200 of determining the actual time a processor consumed in executing a code portion. Method 200 is merely an illustrative embodiment of a method of determining an actual execution time of a code portion, and is not intended to limit the scope of the invention. Any of numerous other implementations of such a method, for example, variations of method 200, are possible and are intended to fall within the scope of the invention.

In Act 202, timer measurements are recorded for the code portion. For example, the thread to which the code portion belongs may include probes at one or more locations, including locations marking the beginning and the end of the code portion, and possibly locations within the code portion (e.g., beginnings and ends of other logical components). During execution of the code portion, a timer measurement may be made at each location of a probe. These measurements may be recorded on a recording medium such as, for example, within a temporary buffer in local (e.g., volatile) memory or on a non-volatile storage medium such as a disk. Examples of information units representing timer measurements are described below in relation to FIG. 4.

Figures 3, 4:
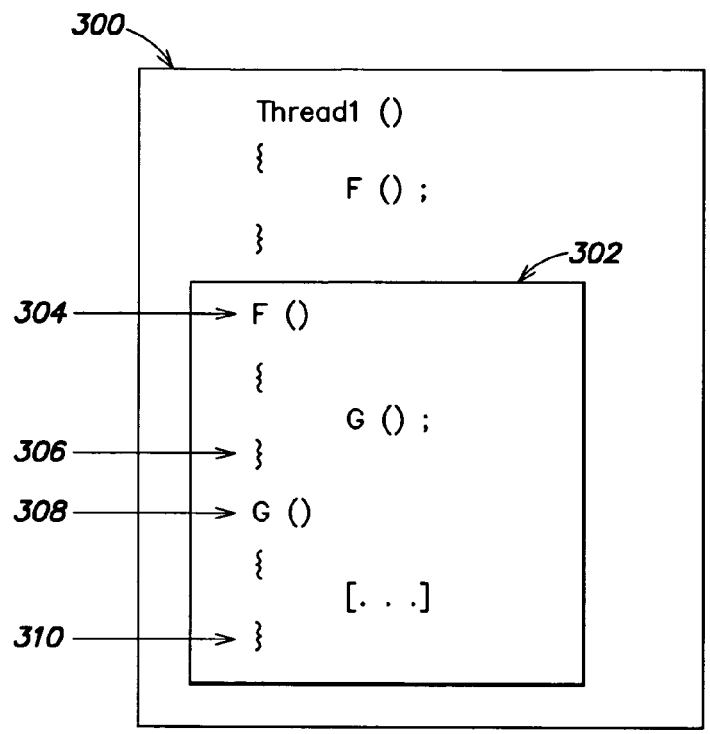
FIG. 3 is pseudo code representing an example of a thread of code, according to some embodiments of the invention.
FIG. 4 is a block diagram illustrating an example of a table of information elements representing timer measurements, according to some embodiments of the invention.

Digressing briefly from FIG. 2, FIG. 3 is pseudocode representing an example of a thread 300 of code. Code 300 is merely an example of a code thread, and is not intended to limit the scope of the invention. Any of numerous other implementations of the code thread, for example, variations of thread 300, are possible and are intended to fall within the scope of the invention.

FIG. 3, and FIGS. 4-6 to be discussed shortly, will be referenced throughout the specification as non-limiting examples of information from which the active time of a code portion may be determined. It should be appreciated that these examples are provided for illustrative purposes, and are not intended to limit the scope of the invention. Other information may be used.

Thread 300 includes code portion 302, which includes function F( ), where F( ) includes function G( ). Probes for recording the beginning and end of function F( ) (which is also the beginning and end of code portion 302) may be placed at locations 304 and 306 within code portion 302. Further, probes indicating the beginning and end of execution of the function G( ) may be placed at locations 308 and 310.

FIG. 4 is a block diagram illustrating an example of a table 400 of information elements representing timer measurements. FIG. 4 is merely an illustrative embodiment of a table of information elements representing timer measurements, and is not intended to limit the scope of the invention. Any of numerous other implementations of such a table, for example, variations of table 400, are possible and are intended fall within the scope of the invention. For example, table 400 may include more or less entries and columns than illustrated in FIG. 4, and the entries and columns may be arranged in different orders.

Each information element may include a time value field 402, a thread ID field 404 and an event field 406. The units of time used in field 402 (and fields 502 and 604 of tables 500 and 600, respectively) are processor (e.g., CPU) cycles. However, it should be appreciated that the units of time used in these fields may be any of a plurality of other types of units such as, for example, milliseconds. For example, information element 408 specifies that in thread 1, at 900 processor cycles, the function F( ) was entered. Information element 408 may result from the execution of a probe at location 304 of code portion 302 described above in relation to FIG. 3. It should be appreciated that, although processor cycles are the time units used in several examples described herein, other time units may be used.

As another example, information element 410 specifies that in thread 2, at 1010 ms, function S( ) was entered. Further, information elements 416, 420 and 422 may result from probes located at locations 308, 310 and 306, respectively, of code portion 302.

Returning to FIG. 2, in Act 204, context switch events may be recorded. That is, the switching of a context of the processor from one thread to another may be recorded. One of the threads to which the context is switched or from which context is switched may be the thread including the code portion, and one or more threads to which the context switches or from which the context switches may be threads other than the thread including the code portion. On some operating systems (e.g., Windows® XP available from Microsoft Corporation) an Application Programming Interface (API) may be provided that enables context switch events to be captured.

As used herein, an "application programming interface" or "API" is a set of one or more computer-readable instructions that provide access to one or more other sets of computer-readable instructions that define functions, so that such functions can be configured to be executed on a computer in conjunction with an application program. An API may be considered the "glue" between application programs and a particular computer environment or platform (e.g., any of those discussed below) and may enable a programmer to program applications to run on one or more particular computer platforms or in one or more particular computer environments.

For example, a Microsoft® XP OS includes an Event Tracking for Windows (ETW) API that provides a feature for recording context switch events. This feature may be enabled (i.e., turned on) so that it records context switch events (e.g., into a local memory buffer or onto disk). Thus, during the parallel execution of multiple threads on the OS, context switch events, including context switch events during the execution of the code portion, may be recorded. Examples of information elements representing context switch events will now be described in relation to FIG. 5.

Digressing briefly from method 200, FIG. 5 is a block diagram illustrating an example of a table 500 of information elements representing context switch events. Table 500 is merely an illustrative embodiment of a table of information elements representing context switch events, and is not intended to limit the scope of the invention. Any of numerous other implementations of such a table, for example, variations of table 500, are possible and are intended to fall within the scope of the invention. For example, table 500 may include additional entries and/or columns, and the entries and columns may be organized in a different manner.

Each information element may specify a particular time value in the field 502, a thread ID (in old thread ID field 504) of the thread from which context was switched and the thread ID of the thread to which context was switched (in new thread ID field 506). For example, information element 508 indicates that, at time 1000 processor cycles (e.g., from a predefined starting time), the context was switched from thread 1 to thread 2, whereas information element 610 indicates that at 1028 processor cycles, context was switched from thread 2 thread 3.

In some embodiments, instead of fields 504 and 506, each entry may include a single field specifying a thread ID and another field specifying a value (e.g., a flag) indicating whether the thread identified by the thread ID is being switched to (i.e., switched in) or switched from (i.e., switched out). Other embodiments of entries may be used.

Returning to FIG. 2, in Act 206, overhead measurements for particular types of events (e.g., function entry, function exit and other types of events) may be obtained. These measurements may be obtained from previous measurements made for different event types at an earlier time, for example, in a controlled testing environment. Alternatively, overhead measurements may be measured and recorded during the execution of the code portion being measured. Examples of information elements representing overhead measurements will now be described in relation to FIG. 6.

FIG. 6 is a block diagram illustrating an example of a table 600 including a plurality of information elements representing overhead measurements. Table 600 is merely an illustrative embodiment of a table of information elements representing overhead measurements, and is not intended to limit the scope of the invention. Any of numerous other implementations of such a table, for example, variations of table 600, are possible and are intended to fall within the scope of the invention. For example, table 600 may include additional entries and/or columns, and the entries and columns may be organized in a different manner.

Table 600 may include information elements 606 and 608, where each information element has an event type field 602 specifying an event type and an overhead time field 604 specifying the overhead time associated with the event type. For example, information element 606 indicates that the function entry event type has an overhead time of 3 processor cycles, and information element 608 indicates that the function exit event type has an overhead of 2 processor cycles. Entries 606 and 608 assume a same amount of time consumed (3 and 2 processor cycles, respectively) every time a function is entered and exited, respectively. However, in some embodiments, overhead may be measured and recorded each time a function is entered or exited, and this information may be recorded in a different format than that shown in table 600.

Returning to FIG. 2, in Act 208, the actual time of the code portion may be determined based on the timer measurements, context switch events and overhead measurements, for example, as described below in relation to FIG. 7. Method 200 or portions thereof may be implemented using system 800 described below in relation to FIG. 8.

Method 200 may include additional acts. Further, the order of the acts performed as part of method 200 is not limited to the order illustrated in FIG. 51, as the acts may be performed in other orders and/or one or more of the acts may be performed in series or in parallel, at least partially. For example, one or more context switched events may be recorded as part of act 204 in parallel or before the recording of one or more timer measurements as part of act 202.

Figure 7:
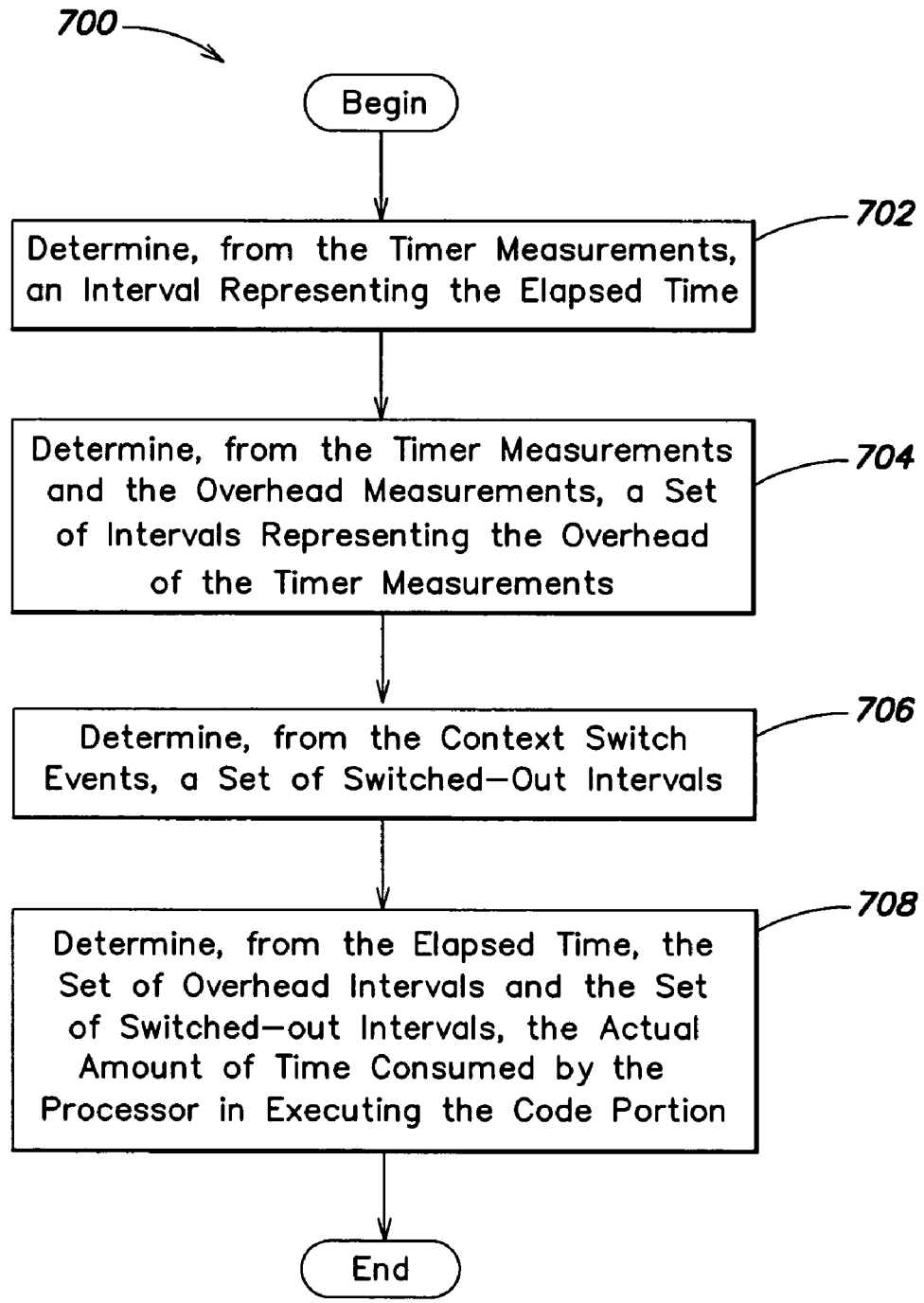
FIG. 7 is a flow chart illustrating an example of a method of the determining, based on timer measurements, context switch events and overhead measurements, an actual time a processor consumes in executing a code portion, according to some embodiments of the invention.

FIG. 7 is a flow chart illustrating an example of a method 700 of determining, based on timer measurements, context switch events and overhead measurements, the actual time a processor consumes in executing a code portion, for example, as part of the performance of Act 208 of method 200. Method 700 is merely an illustrative embodiment of a method of determining an actual time a processor consumes in executing a code portion, and is not intended to limit the scope of the invention. Any of numerous other implementations of such a method, for example, variations of method 700, are possible and are intended to fall within the scope of the invention. Method 700 and acts thereof may be implemented using one more elements of system 800 described below in relation to FIG. 8.

In Act 702, an interval representing the elapsed time of the code portion may be determined from the timer measurements. For example, given a set of timer measurements (e.g., those recorded in Act 202) and a thread identifier, an interval representing the elapsed time of a code portion of the identified thread may be determined.

For example, using the information provided in table 400, for which the thread having a thread ID of I represents thread 300 illustrated in FIG. 3, Act 702 may include the following. The information elements of table 400 not corresponding to thread 1 (e.g., information elements 410, 412, 414 and 418) may be removed, and the remaining information elements may be sorted by time value field 402. The earliest time value and the latest time value represented by the sorted information elements are selected to define the begin time and the end time, respectfully, of the elapsed time interval. For example, applying Act 702 to the information elements of table 400 may result in an elapsed time interval of (900, 1550). Act 702 may be performed by elapsed time interval generator 830 described below in relation to FIG. 8.

In Act 704, a set of intervals representing the overhead of the timer measurements may be determined from timer measurements and overhead measurements such as, for example, the timer measurements and overhead measurements recorded and obtained in Acts 202 and 206, respectively. That is, the overhead time associated with each timer measurement corresponding to the thread in question may be determined and represented as an interval. Using the example of FIGS. 3, 4 and 6, Act 704 may include first removing information elements of table 500 that do not correspond to thread 1, and the remaining information elements may be sorted by time value field 502. For each information element corresponding to thread 1, the overhead associated with the event identified in event field 406 may be determined from table 600. For example, information element 508 corresponds to the event of entering function F( ) which is a function entry event type. Information element 606 of table 600 indicates that the overhead associated with the function entry event type is three processor cycles. An overhead interval then may be defined as: (time value, time value plus overhead time). Thus, for information element 408, an overhead interval of (900, 903) may be produced.

As another example, information element 520 specifies an exit function G( ) event, which has an event type of function exit. Information element 608 of table 600 indicates that a function exit event type has an overhead of two processor cycles. Accordingly Act 702 may include producing an overhead interval of (1500, 1502) from information element 420. It should be appreciated that Act 704 may not include determining an overhead interval for the time measurement information element specifying a latest time of the times specified by the sorted information elements (i.e., the information elements corresponding to the thread in question). This information element may be excluded from act 704 because the overhead time associated with this time of measurement does not add any overhead to the actual time the processor consumes in executing the code portion. That is, this last time measurement indicates the end of the elapsed time, so the overhead in acquiring this end time measurement occurs after the recorded end time itself, and thus does not effect the active time.

Thus, performing Act 704 on the information elements of tables 400 and 600 may result in a set of overhead intervals of: {(900, 903), (1200, 1203), (1500, 1502)}.

In Act 706, a set of switched-out intervals may be determined from context switch events such as, for example, the context switch events recorded in act 204. The switched-out intervals represent the intervals of time, during the elapsed time, during which the processor is executing a thread other than the thread of the code portion. For example, in the timing diagram 100 of FIG. 1, graph 106 indicates a switched-out interval from 3 ms to 6 ms.

Using the example of table 500 of FIG. 5 to determine a set of switched-out intervals of thread 1, information elements of table 500 that do not refer to thread 1 in either fields 504 or 506 are removed. The remaining context switched information elements may be sorted by time field 502. Each context switch event corresponding to the switching from switch 1 to another thread (i.e., a "switch-out event") may be identified (e.g., the context switch events represented by information elements 608 and 516). For each of these switch-out events, a corresponding context switch event that switches back into thread 1 (i.e., a switch-in event) may be identified. For the switched-out events represented by information elements 508 and 516, the corresponding switch-in events may be identified as those represented by information elements 514 and 518. Each switched-out event/switched-in event pair may define a switched-out interval. Thus, performing Act 706 on the context switch events represented in table 500 may result in a set of switched-out intervals of: {(1000, 1190), (1225, 1411)}.

In Act 708, the actual amount of time consumed by the processor in executing the code portion may be determined from the elapsed time, the set of overhead intervals and the set of switched-out intervals. For example, the cumulative time defined by all of the overhead intervals and all of the switched-out intervals may be subtracted from the elapsed time to produce the active time of the code portion. That is, the active time equals the elapsed time minus (overhead intervals plus switched-out intervals).

Using the example results from acts 702, 704 and 706 described above, the active time of the code portion 302 of thread 300:

$$= 650 - [(900, 903) + (1200, 1223) +$$
$$(1500, 1502) + (1000, 1190) + (1225, 1411)]$$
$$= 650 - (3 + 3 + 2 + 190 + 186)$$
$$= 650 - 384$$
$$= 266.$$

Thus, applying method 700 to the information provided in FIGS. 3-6 results in a value of 266 processor cycles as the actual time the processor consumes in executing the code portion 302.

Method 700 may include additional acts. Further, the order of the acts performed as part of method 700 is not limited to the order illustrated in FIG. 7, as the acts may be performed in other orders and/or one or more of the acts may be performed in series or in parallel, at least partially. For example, any of Acts 702-706 may be performed before, after or in parallel to one another.

Methods 200 and 700, acts thereof and various embodiments and variations of these methods and these acts, individually or in combination, may be defined by computer-readable signals tangibly embodied on or more computer-readable media such as, for example, non-volatile recording media, integrated circuit memory elements, or a combination thereof. Computer-readable media can be any available media that can be accessed by a computer. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, other types of volatile and non-volatile memory, any other medium which can be used to store the desired information and which can accessed by a computer, and any suitable combination of the foregoing.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, wireless media such as acoustic, RF, infrared and other wireless media, other types of communication media, and any suitable combination of the foregoing.

Computer-readable signals embodied on one or more computer-readable media may define instructions, for example, as part of one or more programs, that, as a result of being executed by a computer, instruct the computer to perform one or more of the functions described herein (e.g., method 500, method 700, or any acts of the foregoing), and/or various embodiments, variations and combinations thereof. Such instructions may be written in any of a plurality of programming languages, for example, Java, J#, Graphical Basic, C, C#, or C++, Fortran, Pascal, Eiffel, Basic, COBOL, other programming languages, or any of a variety of combinations thereof. The computer-readable media on which such instructions are embodied may reside on one or more of the components of any of systems 800, 900, and 1000 described herein, may be distributed across one or more of such components, and may be in transition therebetween.

The computer-readable media may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement aspects of the present invention discussed above.

Figure 9:
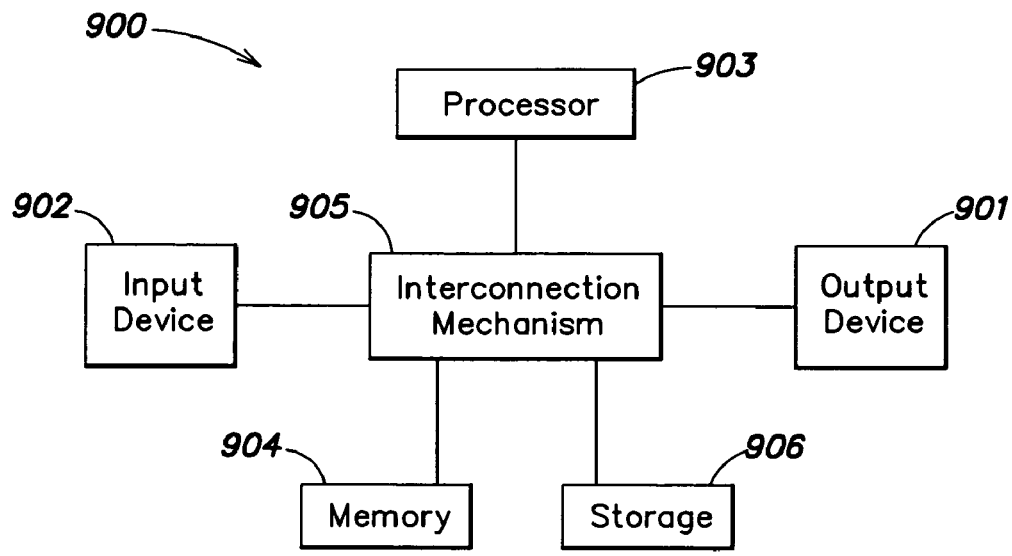
FIG. 9 is a block diagram illustrating an example of a computer system on which some embodiments of the invention may be implemented, according to some embodiments of the invention.
Figure 10:
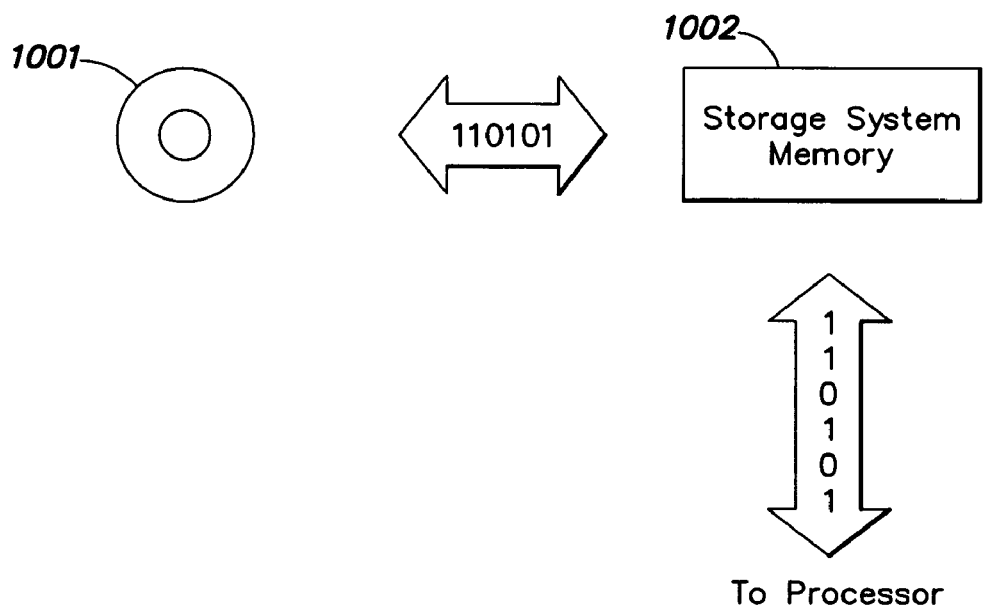
FIG. 10 is a block diagram illustrating an example of a storage system that may be used as part of the computer system to implement some embodiments of the invention, according to some embodiments of the invention.

It should be appreciated that any single component or collection of multiple components of a computer system, for example, the computer system described in relation to FIGS. 9 and 10, that perform the functions described herein can be generically considered as one or more controllers that control such functions. The one or more controllers can be implemented in numerous ways, such as with dedicated hardware and/or firmware, using a processor that is programmed using microcode or software to perform the functions recited above or any suitable combination of the foregoing.

Figure 8:
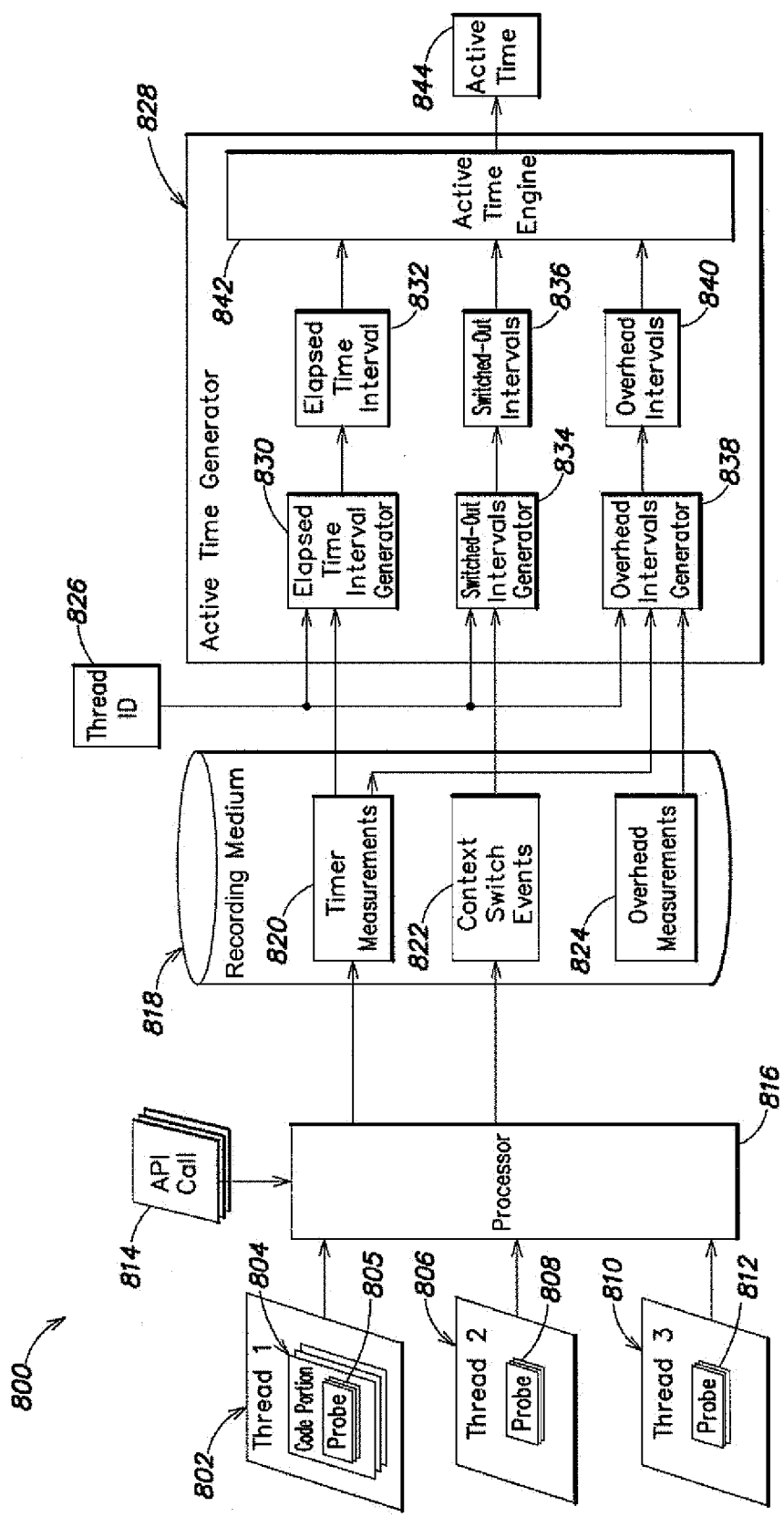
FIG. 8 is a block diagram illustrating an example of a system for determining the actual time consumed by a processor in executing a portion of code, according to some embodiments of the invention.

FIG. 8 is a block diagram illustrating an example of a system 800 for determining the actual time consumed by a processor in executing a portion of code. System 800 may implement method 200 and/or method 700, or portions thereof. System 800 is merely an illustrative embodiment of a system for determining the actual time consumed by a processor in executing a code portion, and is not intended to limit the scope of the invention. Any of numerous other implementations of such a system, for example, variations of system 800, are possible and are intended to fall within the scope of the invention.

System 800 may include any of: Processor 816, recording medium 818, active time generator 828 and other components. Processor 816 may be capable of multi-thread execution, and may be configured to receive one or more threads 802, 806 and 810 in parallel. Each of threads 802, 806 and 810 may include one or more probes 805, 808 and 812, respectively. Thread 802 may include a code portion 804, which may include one or more of probes 805, for which an active time of execution may be determined.

The processor 816 may be configured to execute probes 805, 808 and 812 and, in response, record time measurements 820, for example, as described above in relation to Act 202 of FIG. 2. Further, processor 816 may be configured to generate context switch events 822 representing a switch of context between a plurality of threads, including any of threads 802, 806 and 810. Processor 816 may record context switch events 822 in response to processing one or more API calls 814, for example, as described above in relation to act 204 in FIG. 2. For example, processor 816 may be controlled by a Windows® NT operating system which records context switch events by using the ETW API, as described above. The recording medium 818 also may have overhead measurements 824 recorded thereon.

Active time generator 828 may generate the active time 844 of a given thread based on timer measurements 820, context switch events 822 and overhead measurements 824. Active generator 828 may include any of: elapsed time interval generator 830, switched-out intervals generator 834, overhead intervals generator 838, active time engine 842 and other components.

Elapsed time interval generator 830 may be configured to receive timer measurement 820 and a thread ID 826 and generate elapsed time intervals 832, for example, as described above in relation to act 702.

Switched-out intervals generator 834 may be configured to receive thread ID 826 and context switch events 822 and generate switched out intervals 836, for example, as described above in relation to act 704 of FIG. 7.

Overhead intervals generator 838 may be configured to receive thread ID 826, timer measurements 820 and overhead measurements 824 and generate overhead intervals 840, for example, as described above in relation to act 706.

Active time engine 842 may be configured to receive elapsed time intervals 832, switched out intervals 836 and overhead intervals 840 and generate active time 844 representing the actual time the processor 816 consumed in executing code portion 804. Active time engine 842 may be configured to generate active time 844 as described above in relation to act 708.

System 800 and components thereof, may be implemented using any of a variety of technologies, including software (e.g., C, C#, C++, Java, or a combination thereof), hardware (e.g., one or more application-specific integrated circuits), firmware (e.g., electrically-programmed memory) or any combination thereof. One or more of the components of system 800 may reside on a single device (e.g., a computer), or one or more components may reside on separate, discrete devices. Further, each component may be distributed across multiple devices, and one or more of the devices may be interconnected.

Further, on each of the one or more devices that include one or more components of system 800, each of the components may reside in one or more locations on the system. For example, different portions of the components of these systems may reside in different areas of memory (e.g., RAM, ROM, disk, etc.) on the device. Each of such one or more devices may include, among other components, a plurality of known components such as one or more processors, a memory system, a disk storage system, one or more network interfaces, and one or more busses or other internal communication links interconnecting the various components. System 100, and components thereof, may be implemented using a computer system such as that described below in relation to FIGS. 9 and 10.

Various embodiments according to the invention may be implemented on one or more computer systems. These computer systems, may be, for example, general-purpose computers such as those based on Intel PENTIUM-type processor, Motorola PowerPC, Sun UltraSPARC, Hewlett-Packard PA-RISC processors, any of a variety of processors available from Advanced Micro Devices (AMD) or any other type of processor. It should be appreciated that one or more of any type of computer system may be used to implement various embodiments of the invention.

A general-purpose computer system according to one embodiment of the invention is configured to perform one or more of the functions described above. It should be appreciated that the system may perform other functions and the invention is not limited to having any particular function or set of functions.

For example, various aspects of the invention may be implemented as specialized software executing in a general-purpose computer system 900 such as that shown in FIG. 9. The computer system 900 may include a processor 903 connected to one or more memory devices 904, such as a disk drive, memory, or other device for storing data. Memory 904 is typically used for storing programs and data during operation of the computer system 900. Components of computer system 900 may be coupled by an interconnection mechanism 905, which may include one or more busses (e.g., between components that are integrated within a same machine) and/or a network (e.g., between components that reside on separate discrete machines). The interconnection mechanism 905 enables communications (e.g., data, instructions) to be exchanged between system components of system 900. Computer system 900 also includes one or more input devices 902, for example, a keyboard, mouse, trackball, microphone, touch screen, and one or more output devices 901, for example, a printing device, display screen, speaker. In addition, computer system 900 may contain one or more interfaces (not shown) that connect computer system 900 to a communication network (in addition or as an alternative to the interconnection mechanism 905).

The storage system 906, shown in greater detail in FIG. 10, typically includes a computer-readable-and-writeable nonvolatile recording medium 1001 in which signals are stored that define a program to be executed by the processor or information stored on or in the medium 1001 to be processed by the program. The medium may, for example, be a disk or flash memory. Typically, in operation, the processor causes data to be read from the nonvolatile recording medium 1001 into another memory 1002 that allows for faster access to the information by the processor than does the medium 1001. This memory 1002 is typically a volatile, random access memory such as a dynamic random access memory (DRAM) or static memory (SRAM). It may be located in storage system 906, as shown, or in memory system 904, not shown. The processor 903 generally manipulates the data within the integrated circuit memory 904, 1002 and then copies the data to the medium 1001 after processing is completed. A variety of mechanisms are known for managing data movement between the medium 1001 and the integrated circuit memory element 904, 1002, and the invention is not limited thereto. The invention is not limited to a particular memory system 904 or storage system 1006.

Aspects of the invention may be implemented in software, hardware or firmware, or any combination thereof. Further, such methods, acts, systems, system elements and components thereof may be implemented as part of the computer system described above or as an independent component.

Although computer system 900 is shown by way of example as one type of computer system upon which various aspects of the invention may be practiced, it should be appreciated that aspects of the invention are not limited to being implemented on the computer system as shown in FIG. 9. Various aspects of the invention may be practiced on one or more computers having a different architecture or components that that shown in FIG. 9.

Computer system 900 may be a general-purpose computer system that is programmable using a high-level computer programming language. Computer system 900 also may be implemented using specially-programmed, special-purpose hardware. In computer system 900, processor 903 is typically a commercially available processor such as the well-known Pentium class processor available from the Intel Corporation. Many other processors are available. Such a processor usually executes an operating system which may be, for example, the Windows® 95, Windows® 98, Windows NT®, Windows® 2000 (Windows® ME) or Windows® XP operating systems available from Microsoft Corporation, MAC OS System X available from Apple Computer, the Solaris Operating System available from Sun Microsystems, Linux available from various sources or UNIX available from various sources. Any of a variety of other operating systems may be used.

The processor and operating system together define a computer platform for which application programs in high-level programming languages are written. It should be understood that the invention is not limited to a particular computer system platform, processor, operating system or network. Also, it should be apparent to those skilled in the art that the present invention is not limited to a specific programming language or computer system, and that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems, and that the invention is not limited to any particular distributed architecture, network, or communication protocol.

Various embodiments of the present invention may be programmed using an object-oriented programming language, such as SmallTalk, Java, J# (J-Sharp), C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any suitable combination thereof. Further, various embodiments of the invention may be implemented using Microsoft.NET technology available from Microsoft Corporation.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any equivalent means, known now or later developed, for performing the recited function.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method of determining an amount of time consumed by a processor of a multi-tasking operating system in executing a portion of code of a first processing thread, the method comprising acts of:
   (A) receiving first information indicative of a first temporal interval defining a begin time and an end time of execution of the code portion;
   (B) receiving second information indicative of one or more second temporal intervals, occurring within the first temporal interval, during which the processor executed a processing thread other than the first processing thread, wherein the second information comprises a plurality of second information elements, each second information element specifying a thread to or from which the processor switched context and a particular time at which the processor switched context;
   (C) receiving third information indicative of overhead time consumed in acquiring the first information during the first temporal interval; and
   (D) determining, based on the first, second and third information, the amount of time consumed in executing the code portion by subtracting, from the first temporal interval, the overhead time and a total combined time of the one or more second temporal intervals, wherein the total combined time is determined by the act (D) comprises an act (1) of determining, for each of the one or more second temporal intervals, a begin time and an end time of the second temporal interval based on the second information elements.

2. The method of claim 1, wherein each second information element specifies both an old thread from which the processor switched context at the particular time and a new thread to which the processor switched context at the particular time.

3. The method of claim 1, wherein the first information comprises a plurality of first information elements, each first information element specifying a time, a processing thread and a type of event,
   wherein the act (D) comprises an act of (2) determining the begin time and the end time of the first temporal interval based on the plurality of first information elements.

4. The method of claim 3, wherein the method further comprises an act of (C) receiving third information comprising one or more third information elements, each third information element specifying time consumed in executing a type of event,
   wherein the act (D) further comprises acts of:
   (3) determining, from the first and third information elements, a total overhead time consumed by the processor during the first temporal interval in acquiring the first information, and
   (4) determining, based on the determinations made in the acts (D)(1)-(D)(3), the amount of time consumed in executing the code portion.

5. The method of claim 1, wherein the acts (A)-(C) are performed on a computer system.

6. A system comprising:
   a processor of a multi-tasking operating system for executing a potion of code of a first processing thread; and
   an actual time generator to
      receive first information indicative of a first temporal interval defining a begin time and an end time of execution of the code portion,
      receive second information indicative of one or more second temporal intervals, occurring within the first temporal interval, during which the processor executed a processing thread other than the first processing thread, wherein the second information comprises a plurality of second information elements, each second information element specifying a thread to or from which the processor switched context and a particular time at which the processor switched context,
      receive third information indicative of overhead time consumed in acquiring the first information during the first temporal interval, and
      generate, based on the first, second and third information, an amount of processor time consumed in executing the code portion by the actual time generator by subtracting, from the first temporal interval, the overhead time and a total combined time of the one or more second temporal intervals, wherein to determine the total combined time the actual time generator is configured to (i) determine, for each of the one or more second temporal intervals, a begin time and an end time of the second temporal interval based on the second information elements.

7. The system of claim 6, wherein each second information element specifies both an old thread from which the processor switched context at the particular time and a new thread to which the processor switched context at the particular time.

8. The system of claim 6, wherein the first information comprises a plurality of first information elements, each first information element specifying a time, a processing thread and a type of event, and wherein the actual time generator is configured to (ii) determine a begin time and an end time of the first temporal interval based on the plurality of first information elements.

9. The system of claim 8, wherein the actual time generator is configured to receive third information comprising one or more third information elements, each third information element specifying time consumed in executing a type of event, and wherein the actual time generator is configured to (iii) determine, from the first and second information elements, a total overhead time consumed by the processor during the first temporal interval in acquiring the first information, and to determine, based on the determinations (i), (ii) and (iii), the amount of time consumed in executing the code portion.

10. The system of claim 6, wherein the actual time generator comprises means for generating the amount of processor time consumed in executing the code portion.

11. A computer memory comprising computer-executable instructions that, as a result of being executed by a computer, control the computer to perform a process of determining an amount of time consumed by a processor of a multi-tasking operating system in executing a portion of code of a first processing thread, the process comprising act of:

(A) receiving first information indicative of a first temporal interval defining a begin time and an end time of execution of the code portion;

(B) receiving second information indicative of one or more second temporal intervals, occurring within the first temporal interval, during which the processor executed a processing thread other than the first processing thread, wherein the second information comprises a plurality of second information elements, each second information element specifying a thread to or from which the processor switched context and a particular time at which the processor switched context;

(C) receiving third information indicative of overhead time consumed in acquiring the first information during the first temporal interval; and (D) determining, based on the first, second and third information, the amount of time consumed in executing the code portion by subtracting, from the first temporal interval, the overhead time and the total combined time of the one or more second temporal intervals, wherein the total combined time is determined by the act (D) comprises an act (1) of determining for each of the one or more second temporal intervals, a begin time and an end time of the second temporal interval based on the second information elements.

12. The computer memory of claim 11, wherein each second information element specifies both an old thread from which the processor switched context at the particular time and a new thread to which the processor switched context at the particular time.

13. The computer memory of claim 11, wherein the first information comprises a plurality of first information elements, each first information element specifying a time, a processing thread and a type of event, wherein the act (D) comprises an act of (2) determining a begin time and an end time of the first temporal interval based on the plurality of first information elements.

14. The computer memory of claim 13, wherein the process further comprises an act of (C) receiving third information comprising one or more third information elements, each third information element specifying time consumed in executing a type of event, wherein the act (D) further comprises acts of:

(3) determining, from the first and third information elements, a total overhead time consumed by the processor during the first temporal interval in acquiring the first information, and (4) determining, based on the determinations made in the acts (D)(1)-(D)(3), the amount of time consumed in executing the code portion.

* * * * *